(12) United States Patent
Lai

(10) Patent No.: US 8,465,273 B2
(45) Date of Patent: Jun. 18, 2013

(54) MOLDING DEVICE FOR FORMING COMPACT LENS BARREL

(75) Inventor: Chien-Nan Lai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/339,203

(22) Filed: Dec. 28, 2011

(65) Prior Publication Data

US 2012/0213881 A1  Aug. 23, 2012

(30) Foreign Application Priority Data

Feb. 22, 2011  (TW) .................................. 100105878

(51) Int. Cl.
B29C 45/26 (2006.01)
(52) U.S. Cl.
USPC ............................ 425/465; 425/466; 425/467
(58) Field of Classification Search
USPC ................. 425/406, 467, 542, 577, 808, 461, 425/465, 466, 468, 438, 412, 112, 123, 129.1, 425/395, 408, 414; 249/63, 122
See application file for complete search history.

(56) References Cited

U.S. PATENT DOCUMENTS

2006/0269647 A1* 11/2006 Watanabe et al. ............. 425/408
2010/0272848 A1* 10/2010 Chang .......................... 425/546

\* cited by examiner

*Primary Examiner* — Joseph S Del Sole
*Assistant Examiner* — Lawrence D Hohenbrink, Jr.
(74) *Attorney, Agent, or Firm* — Altis Law Group, Inc.

(57) ABSTRACT

A molding device for forming a compact lens barrel includes a first mold part and a second mold part. The first mold part includes a generally cylindrical molding recess with an opening defined at an end thereof. The first mold part has a bottom surface facing toward the opening. A first protrusion is formed on the bottom surface. The first protrusion has a round, first top surface. The second mold part includes a core insert and a second protrusion formed on the core insert. The second protrusion has a round, second top surface. The second mold part is received in the molding recess with the second top surface contacting the first top surface. An annular surface portion of one of the first top surface and the second top surface is exposed. The annular surface portion has a width equal to or less than 0.005 mm.

3 Claims, 4 Drawing Sheets

MOLDING DEVICE FOR FORMING COMPACT LENS BARREL

BACKGROUND

1. Technical Field

The present disclosure relates generally to a molding device for forming a compact lens barrel.

2. Description of Related Art

Compact image pick-up apparatuses are used in a variety of consumer electronic devices, such as notebook computers, personal digital assistants (PDAs), and cellular telephones. The compact image pick-up apparatus includes a compact lens barrel, a number of optical lenses received in the compact lens barrel, and an image sensor. The compact lens barrel includes a light incident opening defined in the distal end thereof for allowing the outside light into the lens barrel. The compact lens barrel is usually formed by injection molding using a molding device. For forming a compact lens barrel, a very accurate molding device is demanded.

The molding device includes a first mold part and an opposite second mold part. The first and second mold parts cooperatively form a molding cavity in the shape of the compact lens barrel. The first mold part includes a concave portion, and the second mold part includes a convex portion inserted in the concave portion. The lens barrel is formed in the molding cavity. A first protrusion is formed on an end face of the convex portion, and a second protrusion is formed on an inner bottom surface of the concave portion. The first protrusion is in contact with the second protrusion for forming the light incident opening. A parting surface is formed between the end face of the convex portion and the inner bottom surface of the concave portion. A patching surface with a width greater than 0.02 millimeters (mm) is formed around the parting surface for preventing formation of burrs. However, this results in a very thin inner edge of the compact lens barrel in the light incident opening, thereby causing the inner edge become pervious to light, which may cause glare during image capture.

Therefore, there is a need for a molding device for molding a lens barrel, to overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
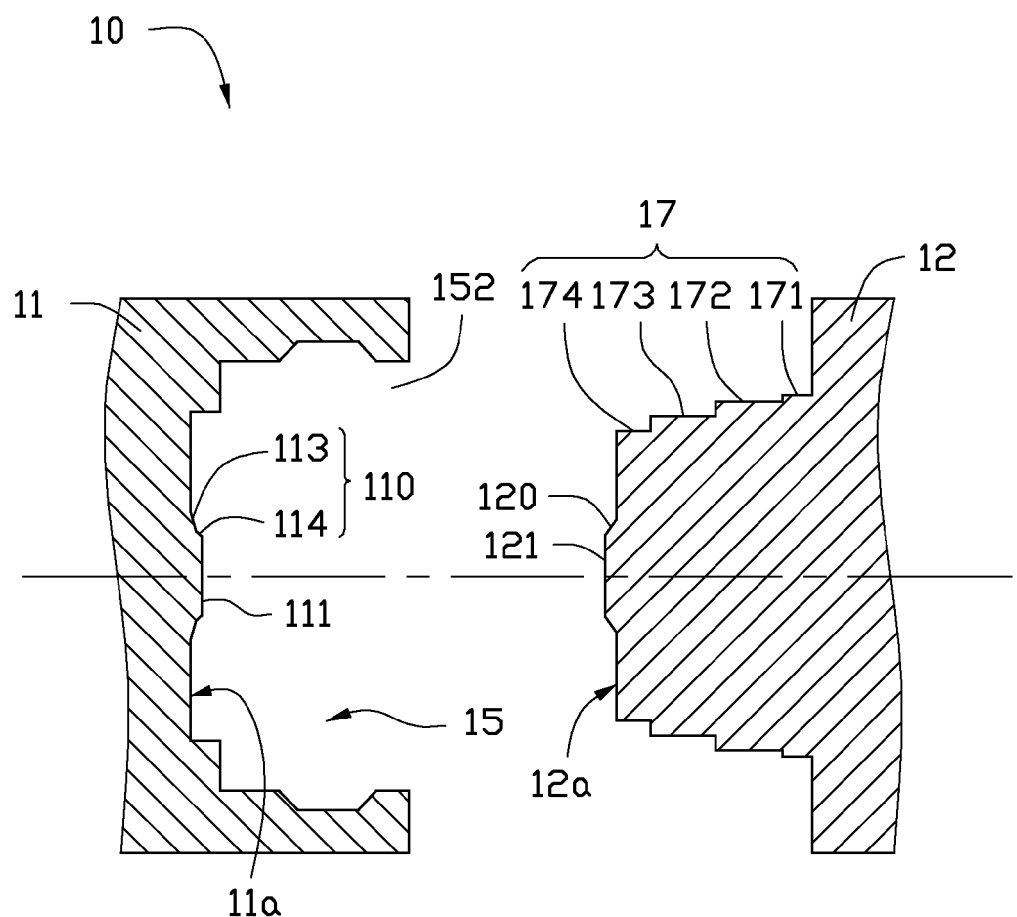
FIG. 1 is a sectional, disassembled view of a molding device for forming a compact lens barrel according to a first exemplary embodiment.
Figure 2:
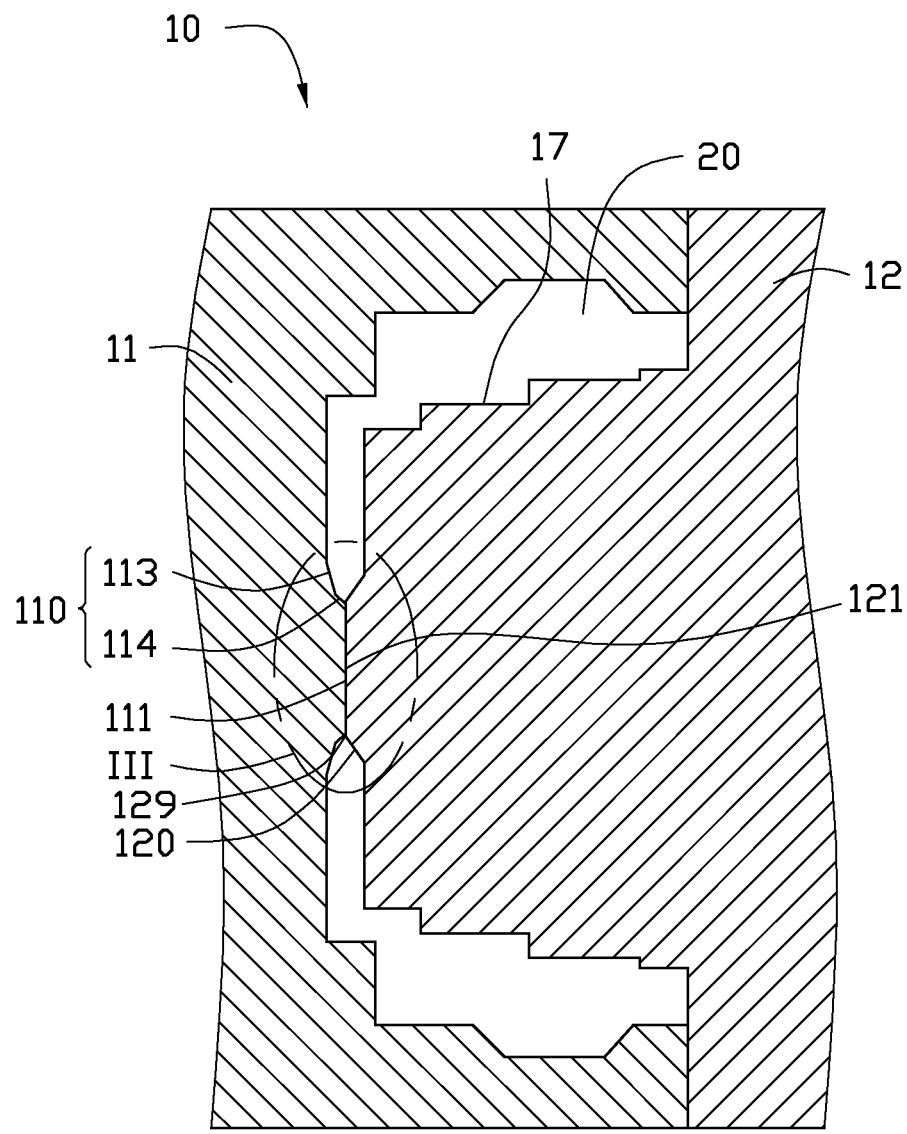
FIG. 2 is a sectional, assembled view of the molding device of FIG. 1.
Figure 4:
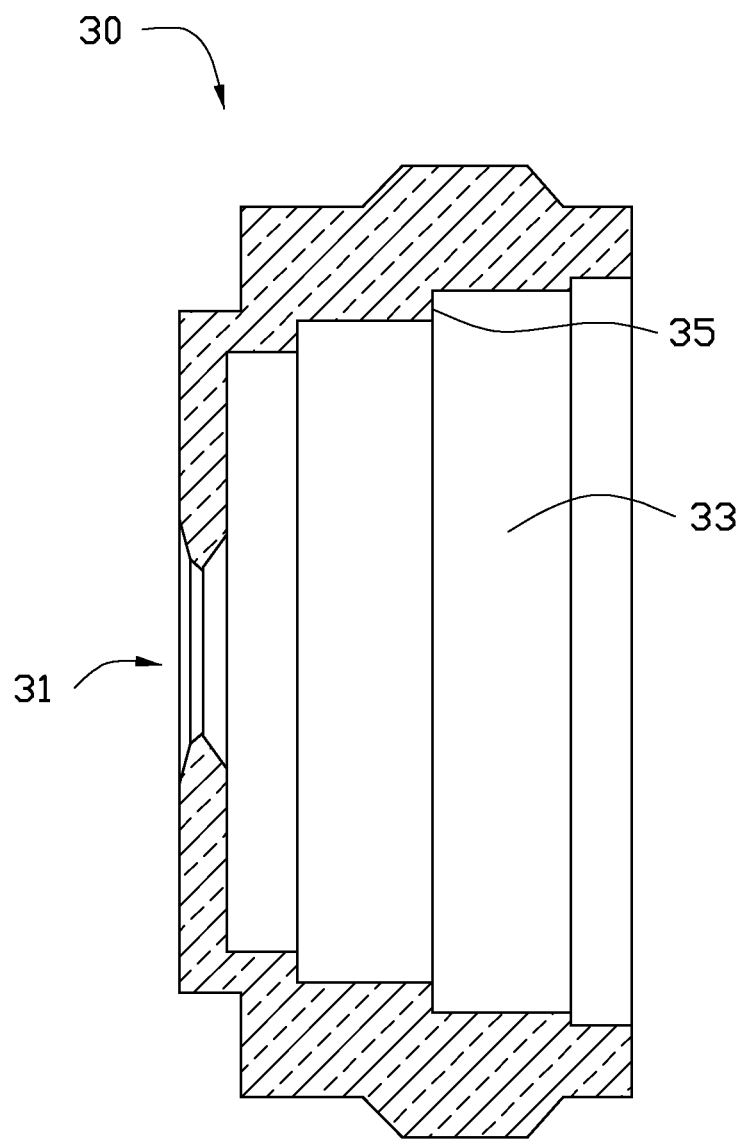
FIG. 4 is a sectional view of a compact lens barrel formed by the molding device of FIG. 2.

Referring to FIGS. 1 and 2, a molding device 10 in accordance with an exemplary embodiment includes a first mold part 11 and a second mold part 12. By injecting plastic materials into the molding device 10, a lens barrel (a lens barrel 30 as shown in FIG. 4) is obtained.

The first mold part 11 has a molding recess 15 with an opening 152. The molding recess 15 is generally cylindrical. The first mold part 11 has a round bottom surface 11a. A first protrusion 110 is formed at the center of the bottom surface 11a. The first protrusion 110 includes a first frustoconical portion 113 protruding from the bottom surface 11a, and a second frustoconical portion 114 on top of the first frustoconical portion 113. The second frustoconical portion 114 has a round, first top surface 111 facing away from the bottom surface 11a and perpendicular to a central axis of the molding recess 15. The first protrusion 110 tapers away from the bottom surface 11a. A side surface of the first frustoconical portion 113 is in smooth connection with a side surface of the second frustoconical portion 114. A cone angle of the first frustoconical portion 113 is greater than that of the second frustoconical portion 114.

The second mold part 12 includes a core insert 17, and a second protrusion 120. The core insert 17 is generally cylindrical, and has an end face 12a. The core insert 17 includes a first cylindrical insert part 171, a second cylindrical insert part 172, a third cylindrical insert part 173, and fourth cylindrical insert part 174 sequentially stacked on one another in the described order away from the end face 12a. The first to fourth cylindrical insert parts 171, 172, 173, 174 are formed in a single body, are coaxial with each other, and have diameters increasing one after the other in the described order. The second protrusion 120 is formed at the center of the end face 12a. The second protrusion 120 is frustoconical and tapers away from the end face 12a. The second protrusion 120 has a round, second top surface 121 facing away from the end face 12a. The second top surface 121 is perpendicular to a central axis of the core insert 17.

Figure 3:
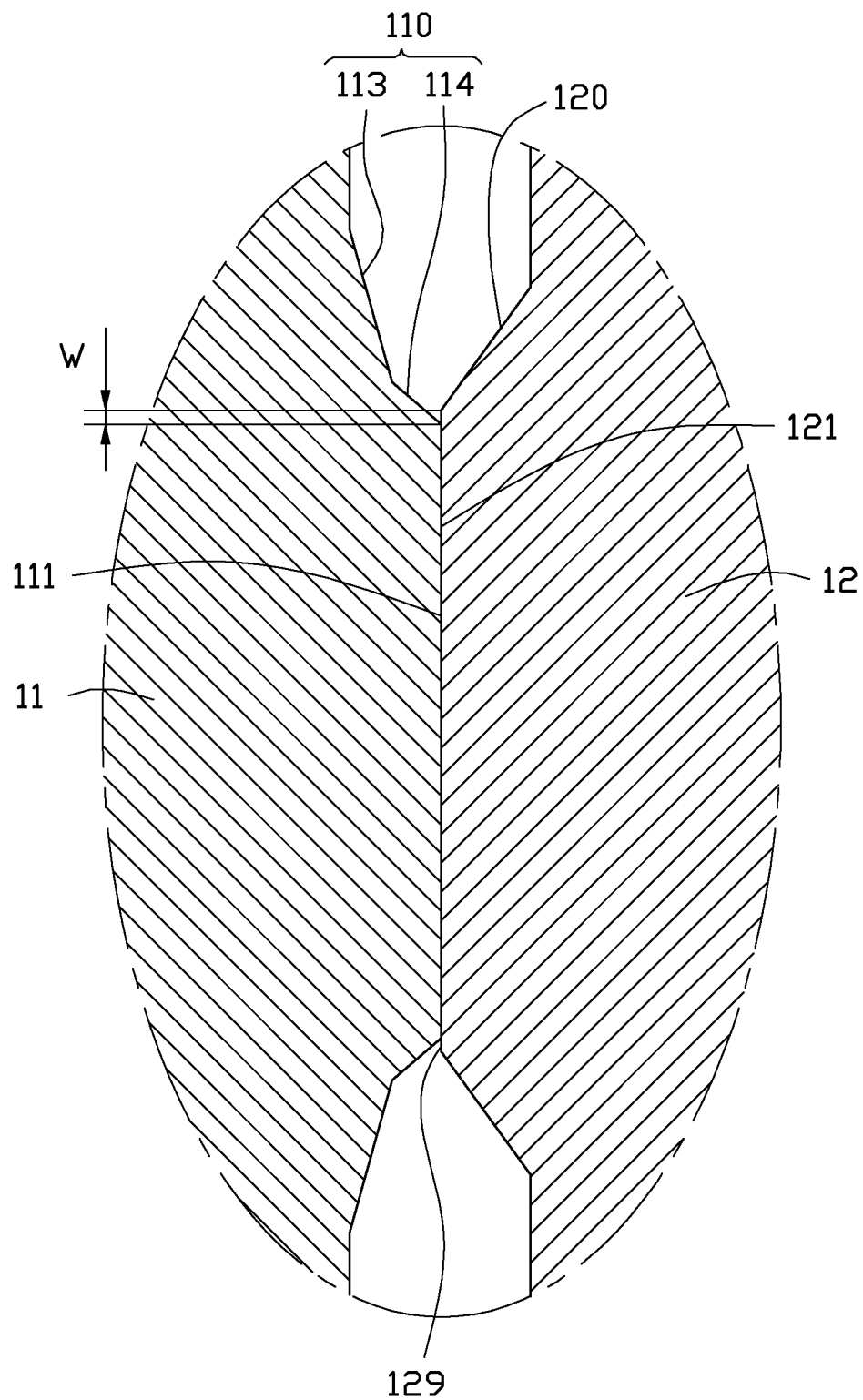
FIG. 3 is an enlarged sectional view of a section III of the molding device of FIG. 2, showing a parting surface between a first mold part and second mold part of the molding device of FIG. 2.

The second mold part 12 is inserted in the molding recess 15 of the first mold part 11. The first to fourth cylindrical insert parts 171, 172, 173, 174 of the core insert 17 have diameters less than that of the molding recess 15, thereby forming a molding cavity 20 in the molding recess 15 between the first molding part 11 and the second molding part 12. The molding cavity 20 has a shape of the lens barrel 30 as shown in FIG. 4. The first top surface 111 is in contact with and coaxial with the second top surface 121. Referring to FIG. 3, the second top surface 121 has a greater diameter than that of the first top surface 111, thus an annular, patching surface 129 in the second top surface 121 is exposed to the molding cavity 20. The patching surface 129 has a width W satisfying $0 < W \leq 0.005$ mm. In this embodiment, the width W is 0.005 mm.

Referring to FIG. 4, molding materials are injected into the molding cavity 20 of the molding device 10 and are then cured, thereby obtaining a lens barrel 30. The lens barrel 30 includes a receiving hole 33 corresponding to the core insert 17 for receiving optical elements, such as optical lenses, and a light incident opening 31 corresponding to the first top surface 111 and the second top surface 121. Four steps 35 are formed in the receiving hole 33 because of the first to fourth cylindrical insert parts 171, 172, 173, 174 with different diameters. Optical elements received in the receiving hole 33 can contact with the steps 35 for being more firmly fixed to the lens barrel 30. The patching surface 129 can prevent burrs forming on the lens barrel 30. Also, because the patching surface 129 is narrow, the glare is reduced. In a glare test of the lens barrel 30 in this embodiment, glare almost disappears completely.

It is to be understood that the first top surface 111 can also have greater diameter than that of the second top surface 121, thereby an annular patching surface within the first top surface around the second top surface 121. In this situation, the width of the patching surface also satisfies $0 < W \leq 0.005$ mm.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A molding device for forming a compact lens barrel, comprising:

a first mold part comprising a generally cylindrical molding recess with an opening defined at an end thereof, the first mold part having a bottom surface in the cylindrical molding recess facing toward the opening, a first protrusion formed on the bottom surface, the first protrusion comprising a first frustoconical portion protruding from the bottom surface, and a second frustoconical portion on top of the first frustoconical portion, a side surface of the first frustoconical portion being in smooth connection with a side surface of the second frustoconical portion, a cone angle of the first frustoconical portion being greater than the cone angle of the second frustoconical portion, the first frustoconical portion and the second frustoconical portion being coaxial with the molding recess, the second frustoconical portion having a round, first top surface; and a second mold part comprising a generally cylindrical core insert and a second protrusion formed on an end face of the core insert, the second protrusion being frustoconical and coaxial with the core insert, the second protrusion having a round, second top surface with a different diameter from that of the first top surface, the second mold part received in the molding recess with the second top surface coaxial with and contacting the first top surface, such that an annular surface portion of one of the first top surface and the second top surface is exposed, the annular surface portion having a width equal to or less than 0.005 mm, the first protrusion and the second protrusion configured for forming a light incident opening of the compact lens barrel.

2. The molding device of claim 1, wherein the diameter of the second top surface is greater than that of the first top surface, the annular surface portion is part of the second top surface.

3. The molding device of claim 1, wherein the core insert comprises a first cylindrical insert part and a second cylindrical insert part formed on the first cylindrical insert part, the second cylindrical insert part having a smaller diameter than that of the first cylindrical insert part, and being coaxial with the first cylindrical insert part, the second protrusion being formed on an end face of the second cylindrical insert part.

* * * * *